ELECTRONIC ORGAN STOP SWITCHING

Filed March 13, 1962 3 Sheets-Sheet 1

INVENTOR.
John R. Brand
BY
Olson, Trexler, Wolters & Bushnell Att'ys.

ELECTRONIC ORGAN STOP SWITCHING

Filed March 13, 1962 3 Sheets-Sheet 2

INVENTOR.
John R. Brand
BY
Olson, Trexler, Wolters & Bushnell attys.

Sept. 29, 1964 J. R. BRAND 3,151,203

ELECTRONIC ORGAN STOP SWITCHING

Filed March 13, 1962 3 Sheets-Sheet 3

INVENTOR.
John R Brand
BY:
Olson, Trexler
Wolters & Bushnell attys

United States Patent Office 3,151,203
Patented Sept. 29, 1964

3,151,203
ELECTRONIC ORGAN STOP SWITCHING

John R. Brand, Pacoima, Calif., assignor to The Wurlitzer Company, Chicago, Ill., a corporation of Ohio Filed Mar. 13, 1962, Ser. No. 179,327
6 Claims. (Cl. 84—1.19)

This invention relates to the production of music, and more particularly to an improved electronic organ.

In electronic organs, as in conventional organs, various voices of the organ are produced by actuating stop tablets. In electronic organs, this is done usually by controlling the switching in and out of various filters by means of the stop tablets. When it is desired to switch from one voice or another, or when different banks of tone generators are to be brought into play, it is generally necessary quickly to manipulate several stop tablets. This is extremely difficult for the novice player, and may even be awkward or inconvenient for a skilled organist.

Accordingly, it is an object of this invention to provide simple and improved means for pre-setting a group of stop tablet switches.

It is another object of this invention to provide, in an electronic organ, a simple single-pole double-throw switch for simultaneously rendering a plurality of tone filters effective or ineffective.

More particularly, it is an object of this invention to provide, in an electronic organ, a plurality of stop switches leading from filter input to ground, in combination with a single-pole single-throw switch for simultaneously ungrounding all of said switches and connecting them to an amplifier input.

Figures 1, 2, 3, 4:
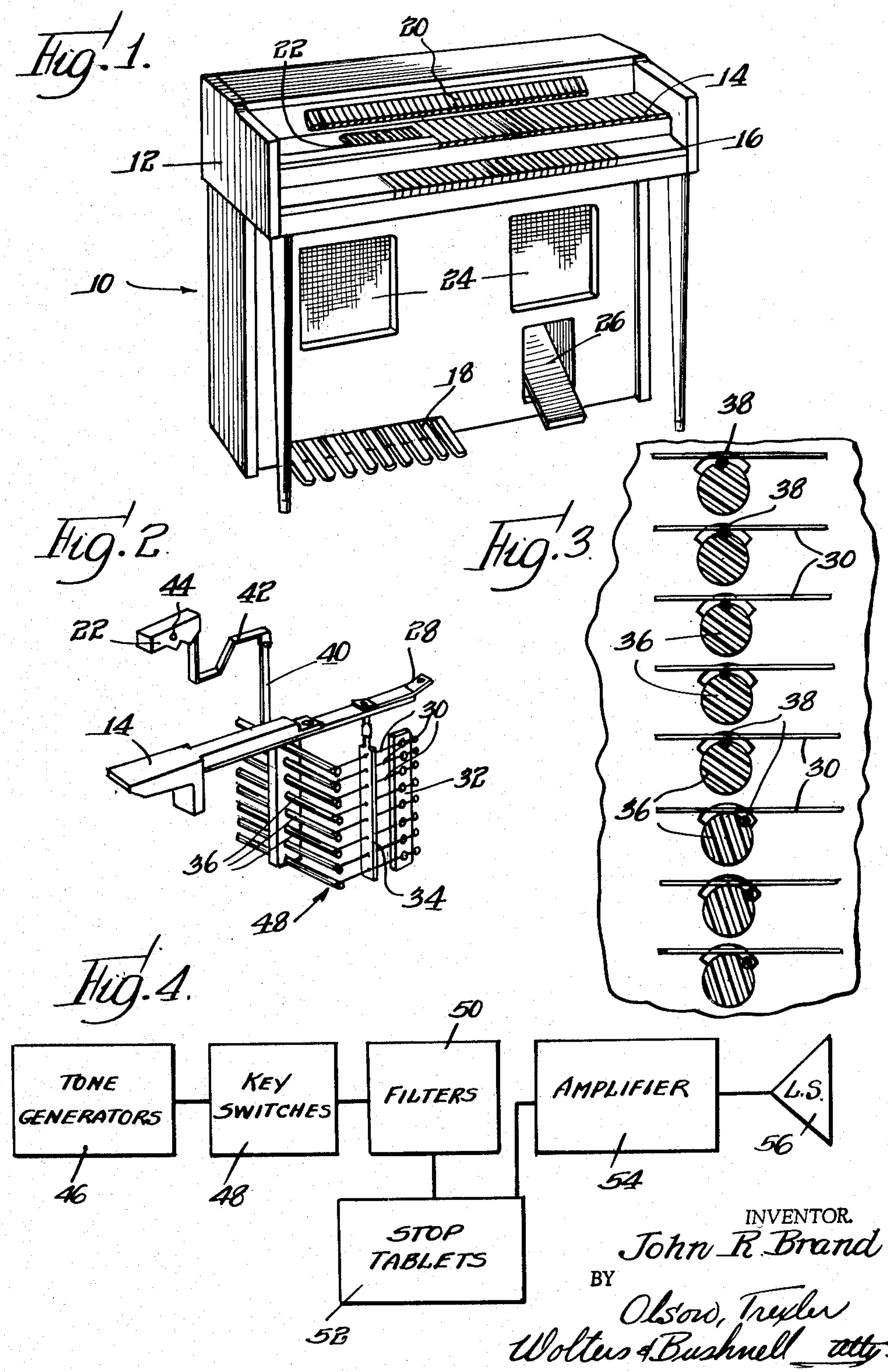
Figure 5A:
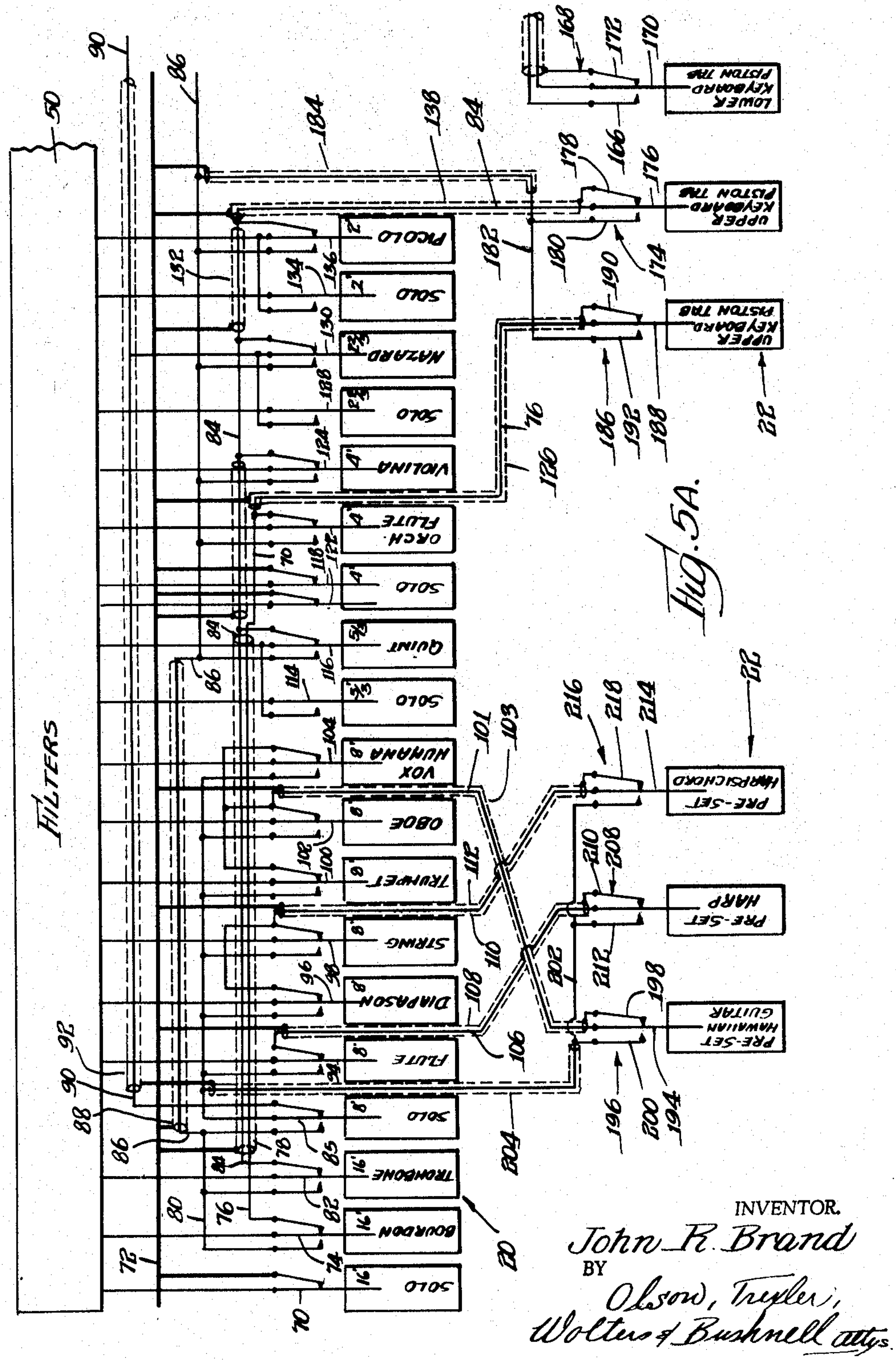
Figure 5B:
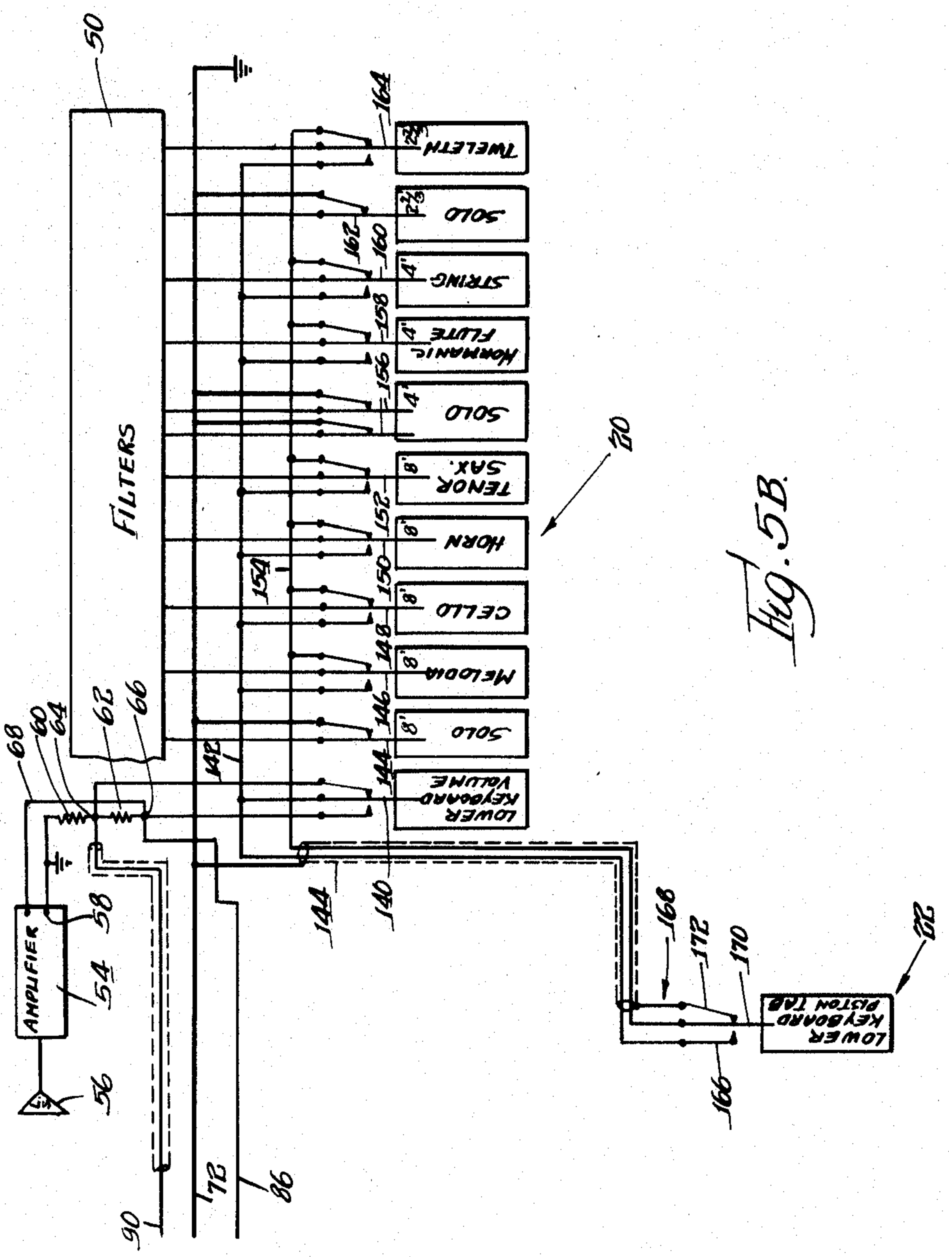

Other and further objects and advantages of the present invention will be apparent from the following description when taken in connection with the accompanying drawings wherein FIG. 1 is a perspective view of an electronic organ constructed in accordance with the principles of this invention, FIG. 2 is a perspective view of a key switch and stop tablet arrangement such as may be used in connection with the present invention, FIG. 3 is a detailed side view of the key switch arrangement, FIG. 4 is a block diagram illustrating the electrical aspects of the invention, FIG. *5a* is a schematic wiring diagram of certain of the stop tablet operated switches and FIG. *5b* is a similar diagram which may be lined up immediately to the right of FIG. *5a*.

Turning now to FIG. 1, there will be seen an electronic organ generally designated by the numeral 10, and including a cabinet 12. The organ is provided with a pair of keyboards or manuals 14 and 16, and with a pedal clavier 18. A plurality of stop tablets 20 is provided above the upper manual 14, and the switches associated therewith will be set forth in greater detail hereinafter. An additional group of stop tablets 22 is positioned to the left of the upper manual, and these may control other functions, including the movement of "fixed" switch contacts, as will be brought out presently. The electronic organ 10 also includes suitable loudspeakers mounted behind grills 24 and a swell control foot pedal 26 for controlling the volume of the instrument.

The present organ is one in which each key of the two keyboards simultaneously operates a plurality of switch contacts. Although various such arrangements are well known, one suitable construction is shown in Osborne et al. Patent 2,846,916. Part of the structure of the Osborne et al. patent is shown in FIGS. 2 and 3, wherein there is shown one of the keys 14, which may be mounted from a fixed support by means of a flexure spring 28. A plurality of movable whiskers or contacts 30 is mounted in a fixed insulating member 32, and an insulating actuator 34 engages all of the whiskers 30 and is abutted at the top by the structure associated with the key 14 for lowering all of the whiskers 30 simultaneously. A plurality of insulating rods 36 is disposed below the key and each such rod carries a conductive insert 38 lying along an element of the rod.

Each rod may be rotatable, in accordance with the Osborne et al. patent, or some of the rods may be fixed with the conductive inserts 38 in position to be engaged by the whiskers 30. In FIG. 3, the top five rods 36 have been shown with the contacts 38 in position for engagement by the whiskers 30, and they may be fixed in this position. The bottom three rods 36 are shown as being rotatable, and specifically are illustrated with the rods rotated to the "off" position where the rods themselves will be engaged by the whiskers 30 rather than having the whiskers engage the contact inserts 38. Each of the movable rods, for example, the bottom three rods in FIG. 3, is provided with a crank arm (not shown) which is pivotally connected at its end to a connecting rod 40. Each connecting rod 40 is pivotally connected at its upper end to an arm 42 fixed to an appropriate one of the stop tablets 22. Each stop tablet 22 is pivotable about a central transverse axis, as indicated at 44. Pivoting of the stop tablet 22 causes the arm 42 to move up or down, thereby similarly moving the connecting rod 40 to produce rotation of the accompanying insulating rod 36 between the "on" and "off" positions.

The present electronic organ is of the type that might be termed subtractive, in that a complex wave rich in harmonics is generated, and portions thereof are filtered out to provide the desirable remaining portions. This is in distinction to the additive type organ in which a plurality of sine waves is generated and added together. In FIG. 4, the tone generators have been indicated at 46, and these are connected through key switches 48 to filters 50. As will be appreciated, each key switch 48 comprises one of the whiskers 30, and the accompanying conductive insert 38 of one of the rods 36. The filters 50, in turn, are connected to stop tablets 52, and from hence there is a connection to the amplifier 54 feeding the loudspeaker means 56 behind the grills 24. As will be understood, the loudspeaker means can comprise a single loudspeaker, or a plurality of loudspeakers of similar or different sizes, all in accordance with known principles relative to the production of sound.

Reference now should be had to FIG. *5a* and FIG. *5b* together, whereby the filters 50 again are shown in block form. Preferably these comprise a plurality of individual filters, of resistance-capacitance type, or of inductance-capacitance type, all in accordance with known principles. The individual filters or filter sections are connected to the stop switches, as hereinafter set forth. Part of the structure will be taken up first which is connected to the amplifier, whereby more readily to understand the sequence of connections. Thus, the amplifier 54 and loudspeaker 56 are again shown schematically at the upper left corner of FIG. *5b*. The amplifier has one grounded terminal as indicated at 58, and also connected to ground is a resistor 60, joined to a resistor 62 at junction 64. The opposite end of the resistor 62 has a terminal or junction 66, and wire 68 leads from the terminal 66 to the ungrounded input connection of the amplifier 34.

The stop tablets 20 previously referred to are shown in FIGS. *5a* and *5b*, and each is clearly labeled as to its function. Each of the stop tablets 20 directly operates a switch. All of the switches are of the single-pole type, and some are single-throw, some double-throw. Such switches are well known in the art, and the individual parts of each switch accordingly are not labeled therein.

Starting at the left end of FIG. *5a,* the first stop tablet 20 is a SOLO stop tablet. The movable contact of the associated switch 70 is connected to the filters 50, and the fixed contact is connected to a ground line 72. The SOLO switch 70 is connected in a filter circuit to cause the next two stops to the right thereof to play at the same volume as the remaining stops, or at a higher volume to cause them to stand out in solo fashion.

The next stop tablet to the right is a BOURDON stop tablet, and the associated switch 74 is a single-pole double-throw switch. The movable contact is connected to the filters 50, and the fixed right contact, with which the movable contact engages in the normal position shown, is connected to a collector line 76 within a grounded shield 78. The left fixed contact is connected to a common line 80.

The next successive stop tablet is a TROMBONE stop tablet. The left fixed contact of the associated switch 82 is connected to the common line 80, the movable contact is connected to the filters, and the right fixed contact is connected to a collector 84 within the shield 78.

The next stop tablet is another SOLO stop tablet, and the movable contact of the associated single-role double-throw switch 85 is connected to the filters The left fixed contact is connected to a collector 86 extending through a grounded shielded lead 88. The right fixed contact of the switch 85 is connected to another collector line 90 extending through a grounded shielded lead 92.

The first three stop tablets referred to are 16 ft. stops. The SOLO tablet associated with switch 85 is an 8 ft. stop. The remaining 8 ft. stops, in order, comprise DIAPASON, STRING, TRUMPET, OBOE and VOX HUMANA, respectively operating the switches 94, 96, 98, 100, 102 and 104. Each of the movable contacts is connected to the filters 50. The left fixed contact of each of these switches associated with the 8 ft. stop tablets is connected to the common line 80. The right fixed contact of the switch 94 is connected to a lead 106 within a grounded shield 108.

The right fixed contact of the two switches 96 and 98 are connected in common to a lead 110 within a shield 112. The right fixed contacts of the three switches 100, 102 and 104 are connected in common to a lead 101 extending through a grounded shield 103.

The next two stop tablets are for a 5⅓ ft. stop, and comprises a single-throw switch 114, and a double-throw switch 116. The movable contacts of both switches are connected to the filters 50. The single fixed contact of the switch 114 is connected to the movable contact of the switch 116. The left fixed contact of the switch 116 is connected to the shielded collector 86, while the right fixed contact is connected to the shielded collector 84.

The next three stop tablets are 4 ft. stop tablets of the upper manual (all of the stop tablets in FIG. *5a* are of the upper manual 14, while those in FIG. *5b* are of the lower manual 16), and respectively comprise SOLO, ORCHESTRAL FLUTE, and VIOLINA. These stop tablets respectively control switches 118, 120 and 122. The switch 118 is a double-pole single-throw switch, comprising two movable switch contacts simultaneously operated by the SOLO stop tablet, and both connected to the filters 50. The cooperating fixed contacts are both grounded. The movable contacts of the switches 122 and 124 are both connected to the filters 50, and both left contacts are connected to the line 86. The right contact of the switch 122 is connected to the previously mentioned line 76 which leads through a grounded shield 126, about which more will be said presently. The right fixed contact of the switch 124 is connected to the previously mentioned line 84.

The next two stop tablets are of the 2⅔ ft. stop and comprise a SOLO and a NAZARD stop tablet. The movable contact of the associated switches 128 and 130 are connected to the filters 50. The left contact of the switch 128, which is a single-throw switch, is connected to the movable contact of the switch 130. The right fixed contact of the switch 130 is connected to the line 84 which leads through a grounded shield 132 and the left fixed contact of the switch 130 is connected to the line 86.

The two remaining stop tablets of the upper manual comprise a 2 ft. stop, and the tablets respectively are SOLO and PICCOLO. The associated switches are numbered 134 and 136, respectively. The movable contacts of both switches are connected to the filters 50. The single fixed contact of the SOLO switch 134 is connected to the movable contact of the switch 136. The left fixed contact of the switch 136 is connected to the line 86, while the right fixed contact is connected to the line 84, which leads through a grounded shield 138.

Coming now to FIG. *5b,* the electrode 90 will be seen to lead to the junction 64, while the line or collector 86 will be seen to lead to the terminal or junction 66.

The next stop tablet is a LOWER KEYBOARD VOLUME stop tablet, arranged to control the volume of all of the remaining stop tablets to the right, which are associated with the lower manual. The LOWER KEYBOARD VOLUME stop tablet controls a switch 140 having a movable contact which is connected to a common line 142, which extends through a grounded shield 144. The left fixed contact of the switch 140 is connected to the terminal or junction 66, and the right fixed contact is connected to the terminal 64. As will be seen, a higher volume is produced when the movable contact of the switch 140 engages the left fixed contact than when it engages the right fixed contact.

The next five stop tablets, all comprise 8 ft. stops of the lower manual, and respectively are the SOLO, MELODIA, CELLO, HORN and TENOR SAX. These five stop tablets respectively operate switches 144, 146, 148, 150 and 152. The movable contacts of all of these switches are connected to the filters 50. The SOLO switch 144 is a single-throw switch, and the single fixed contact thereof is grounded. The remaining four switches have left fixed contacts which are connected to the common line 142. The right fixed contacts of all four of these switches are connected to another common line 154. The line 154 leads through the grounded shield 144, along with the line 142.

The next three stop tablets are 4 ft. stops of the lower manual, respectively comprising SOLO, HARMONIC FLUTE, and STRING. The SOLO stop tablet controls a switch 156 of the double-pole single-throw variety. Both movable contacts are connected to the filters 50, and the two respective fixed contacts are grounded. The HARMONIC FLUTE stop tablet controls a switch 158, while the STRING stop tablet controls a switch 160. Both of these switches are of the single-pole double-throw type with the left fixed contacts of each connected to the common line 142 and the right fixed contacts each connected to the common line 154.

The two remaining stop tablets are 2⅔ ft. stops of the lower manual. The first of these comprises a SOLO stop tablet controlling a single-pole single-throw switch 162. The movable contact is connected to the filters 50, the same as the movable contacts of all of the preceding switches. A single fixed contact is grounded. The other stop tablet comprises a TWELFTH stop tablet controlling a switch 164, having a movable contact connected to the filters 50, a left fixed contact connected to the common line 142, and a right fixed contact connected to the common line 154.

The common line 142 extends through the grounded shield 144 to the left fixed contact 166 of a single-pole double-throw switch 168. The movable contact 170 of this switch is connected to the common line 154, while the right fixed contact 172 is grounded. The movable contact is operable by one of the stop tablets 22 labeled LOWER KEYBOARD PISTON TAB. This stop tablet and associated switch 168 are shown in both FIGS. *5a* and *5b* to illustrate the overlap and connection of the two figures. Another stop tablet immediately to the left is labeled UPPER KEYBOARD PISTON TAB and controls a switch 174. This switch has a movable contact 176 controlled by a stop tablet, and a right fixed contact 178 which is grounded. The movable contact 176 is connected to the line 84, while the left fixed contact 180 is connected to a line 182, leading through a grounded shield 184 to the line 86.

Then to the left of the last mentioned stop tablet, there is a stop tablet labeled UPPER KEYBOARD PISTON TAB, which controls a switch 186. This switch has a movable contact 188 operated by the stop tablet and connected to the shielded line 76. The right fixed contact 190 is grounded, and the left fixed contact is connected to the previously mentioned line 182.

Farther to the left in FIG. *5a*, there are three additional ones of the stop tablets 22, respectively labeled PRE-SET HAWAIIAN GUITAR, PRE-SET HARP, and PRE-SET HARPSICHORD. The GUITAR tablet operates the movable contact 194 of a single-pole double-throw switch 196. The right fixed contact 198 is grounded, and the left fixed contact 200 is connected to a line 202, which leads through a grounded shield 204 to the common line 80. The movable contact 194 is connected to the previously mentioned line 101 in the grounded shield 103.

The HARP stop tablet is connected to operate the movable contact 206 of a single-pole double-throw switch 208 having a right fixed contact 201 which is grounded. The left fixed contact 212 is connected to the line 202.

The HARPSICHORD tablet is connected to operate the movable contact 214 of a single-pole double-throw switch 216, having a right fixed contact 218 which is grounded. The left fixed contact 220 is connected to the line 202.

*Operation*

The operation of the lower manual stop tablets, as shown in *5b*, is most readily seen, and attention is directed there first. The movable contacts of all of the switches from 144 through 164 are shown as engaging the right fixed contacts, all of which are connected to the common line 154. This common line is grounded through the switch contacts 170 and 172, in the position shown. Hence, the inputs to these various switches from the filters 50 are grounded out and produce no result. The tablets from the 8 ft. MELODIA stop tablet through the 2⅔ ft. TWELFTH stop tablet may be operated individually to connect the inputs to the respective switches to the line 142. The line 142 is connected through the movable contact of the switch 140 either to the junction 64 or the terminal or junction 66, depending on the position of the associated stop tablet, and hence to the input line 68 of the amplifier 54. Thus, the outputs of the various filters as determined by closure of the key switches may be applied selectively to the amplifier.

On the other hand, the outputs of all of the filters associated with the lower manual stop tablets may be applied simultaneously. As will be recalled, the line 154 is grounded through the switch contacts 170 and 172. If the LOWER KEYBOARD PISTON TAB is operated to move the movable switch contact 170 into engagement with the left fixed contact 166, then the ground is removed from the line 154, and the line 154 is connected through the switch contacts 170 and 166 to the line 142, and the connection of the line 142 to the amplifier input has just been discussed.

Returning now to FIG. *5a*, it will be apparent that the various stop tablets connected to the line 86 are capable of being manipulated for individual connection of their respective tones thereto. Similarly, the voices associated with the stop tablets controlling the switches connected to the line 80 can be played individually, either at high or low intensity, depending upon the position of the SOLO switch 85, and the resulting connection to either the line 86 or the line 90. Also, the three 16 ft. stops are played individually.

If the PRE-SET HAWAIIAN GUITAR stop tablet associated with the switch 96 is manipulated to change the switch position, then the wire 101 is removed from ground potential, and is connected to the wire 202 which leads to the line 80, and through the SOLO switch 85, either to the line 86 or to the line 90, and hence to the amplifier, thus causing three 8 ft. stops to play simultaneously; namely, TRUMPET, OBOE and VOX HUMANA.

If the PRE-SET HARP tablet is manipulated in the same manner, the lead 106 is removed from ground potential and is connected to the lead 202. This connects the 8 ft. FLUTE stop to the wire 202, and hence to one of the leads 86, 90.

Similarly, if the PRE-SET HARPSICHORD stop tablet is similarly manipulated, the lead 110 is removed from ground potential and is connected to the lead 202, whereby the 8 ft. DIAPASON and the 8 ft. STRING are simultaneously connected either to the lead 86 or to the lead 90.

If the UPPER KEYBOARD PISTON TAB stop tablet is manipulated to change the condition of the switch 186, then the lead 76 is removed from ground potential, and is connected to the lead 182, and hence to the lead 86, and on to the amplifier. This causes the 4 ft. ORCHESTRAL FLUTE, and the 16 ft. BOURDON to play.

If the UPPER KEYBOARD PISTON TAB is manipulated to change the condition of the switch 174, then the lead 84 is removed from ground and is connected to the leads 182 and 86 and on to the amplifier. This causes the 2 ft. PICCOLO, the 2⅔ ft. NAZARD, the 4 ft. VIOLINA, the 5⅓ ft. QUINT, and the 16 ft. TROMBONE simultaneously to play in combination.

Thus, it will be seen that by a very simple switching arrangement, one or a pre-selected group of stops can simultaneously be brought into play by the manipulation of a single stop tablet.

Although a particular embodiment of the invention has been shown and described for illustrative purposes, it will be understood that various modifications thereof as may fall within the spirit and scope of the appended claims do form a part of the present invention.

The invention is hereby claimed as follows:

1. An electronic organ comprising means for providing electric oscillations of different qualities corresponding to different organ stops, amplifier means, electroacoustic transducer means connected to said amplifier means for converting the amplified electric oscillations into audible organ tones, a plurality of manually operable switch means respectively connected to said electric oscillation providing means and also connected to said amplifier means and to ground, said switch means when in one position respectively connecting said oscillation providing means to ground and when in another position respectively connecting said oscillation providing means to said amplifier means, and additional manually operable switch means connected in the ground circuit of pre-selected ones of the first mentioned switch means, said additional switch means in one position connecting said pre-selected ones of the first mentioned switch means to ground and in another position connecting said pre-selected switch means to said amplifier means.

2. An electronic organ as set forth in claim 1 wherein the additional switch means are connected in the ground circuits of pre-selected groups of the first mentioned switch means.

3. An electronic organ comprising means for providing electric oscillations of different qualities corresponding to different organ stops, amplifier means, electroacoustic transducer means connected to said amplifier means for converting the amplified electric oscillations into audible organ tones, a plurality of manually operable single-pole double-throw switch means, each having a movable contact and two fixed contacts, the movable contacts of said switch means being respectively connected to said oscillation providing means, one contact of each of said switch means being respectively connected to ground whereby to ground said electric oscillation providing means with said switch means in one position, and the other fixed contacts of said switch means being connected to said amplifier means, thereby selectively to connect said oscillation providing means to said amplifier means, and additional manually operable switch means interconnected with pre-selected ones of said oscillation providing means and with said amplifier means for selectively connecting said ones of said electric oscillation providing means to said amplifier means.

4. An electronic organ as set forth in claim 3 wherein the additional switch means comprise a plurality of second single-pole double-throw switches respectively having one movable contact and two fixed contacts, the movable contacts being respectively connected to pre-selected ones of the grounded fixed contacts of the first mentioned switch means, one fixed contact of each of said second single-pole double-throw switches being connected to ground, the ground contacts of the first mentioned switch means being connected to ground through the second single-pole double-throw switches, and the second fixed contacts of said second switches being connected to said amplifier means for selectively removing pre-selected ones of the oscillation providing means from the ground and connecting the same to said amplifier means.

5. An electronic organ as set forth in claim 4 wherein the movable contacts of the second switches are respectively connected to groups of the ground contacts of the first mentioned switch means.

6. An electronic organ stop switching circuit comprising a plurality of different tone providing means, a plurality of first single-pole double-throw switches each having two fixed contacts and a movable contact, the movable contacts of said switches being respectively connected to said tone providing means, one fixed contact of each of said switches being connected to an output circuit, the second fixed contact of at least some of said switches being connected in common, a second single-pole double-throw switch having a movable contact and two fixed contacts, the movable contact of the second switch being connected to the first switch fixed contacts which are connected in common, one fixed contact of said second switch being connected to ground, and the other fixed switch contact of said second switch being connected to said output circuit.

References Cited in the file of this patent

UNITED STATES PATENTS

| | | |
|---|---|---|
| 2,489,497 | Oswald | Nov. 29, 1949 |
| 2,562,670 | Kochl | July 31, 1951 |
| 2,699,085 | Zuck | Jan. 11, 1955 |